(12) United States Patent
Uskert et al.

(10) Patent No.: US 11,053,801 B2
(45) Date of Patent: Jul. 6, 2021

(54) GAS TURBINE ENGINE COMPOSITE VANE ASSEMBLY AND METHOD FOR MAKING THE SAME

(71) Applicants: Rolls-Royce North American Technologies, Inc., Indianapolis, IN (US); Rolls-Royce Corporation, Indianapolis, IN (US)

(72) Inventors: Richard C. Uskert, Timonium, MD (US); David J. Thomas, Brownsburg, IN (US); Wayne S. Steffier, Huntington Beach, CA (US); Robert J. Shinavski, Mission Viejo, CA (US); Adam L. Chamberlain, Mooresville, IN (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 210 days.

(21) Appl. No.: 16/201,301

(22) Filed: Nov. 27, 2018

(65) Prior Publication Data
US 2020/0024955 A1    Jan. 23, 2020

Related U.S. Application Data

(63) Continuation of application No. 14/138,725, filed on Dec. 23, 2013, now Pat. No. 10,174,619.
(Continued)

(51) Int. Cl.
*F01D 5/14*  (2006.01)
*F01D 9/04*  (2006.01)
*F01D 5/28*  (2006.01)

(52) U.S. Cl.
CPC .............. *F01D 5/147* (2013.01); *F01D 5/282* (2013.01); *F01D 9/044* (2013.01);
(Continued)

(58) Field of Classification Search
CPC .......... F01D 5/22; F01D 5/225; F01D 5/3007; F01D 5/3023; F01D 5/3038
See application file for complete search history.

(56) References Cited

U.S. PATENT DOCUMENTS 2,772,856 A    12/1956  Kent et al.
3,053,505 A     9/1962  Welsh et al.
(Continued)

FOREIGN PATENT DOCUMENTS

EP    1367037 A2   12/2003
EP    2412928 A1    2/2012
(Continued)

OTHER PUBLICATIONS

International Search Report and the Written Opinion of the International Searching Authority, or the Declaration dated Sep. 8, 2015 for International Application No. PCT/US2013/077469.
(Continued)

*Primary Examiner* — Jacob J Cigna
(74) *Attorney, Agent, or Firm* — Barnes & Thornburg LLP (57) ABSTRACT

A gas turbine engine composite vane assembly and method for making same are disclosed. The method includes providing at least two gas turbine engine airfoil composite preform components. The airfoil composite preform components are interlocked with a first locking component so that mating faces of the airfoil composite preform components face each other. A filler material is inserted between the mating surfaces of the airfoil composite preform components.

20 Claims, 5 Drawing Sheets

Related U.S. Application Data (60) Provisional application No. 61/774,987, filed on Mar. 8, 2013.

(52) U.S. Cl.
CPC ...... *F05D 2230/64* (2013.01); *F05D 2260/36* (2013.01); *F05D 2300/6012* (2013.01); *F05D 2300/6033* (2013.01); *Y02T 50/60* (2013.01); *Y10T 29/49229* (2015.01)

(56) References Cited

U.S. PATENT DOCUMENTS

| | | | |
|---|---|---|---|
| 3,501,247 A | | 3/1970 | Tournere et al. |
| 5,203,488 A | | 4/1993 | Wang et al. |
| 5,272,869 A | | 12/1993 | Dawson et al. |
| 5,350,545 A | * | 9/1994 | Streckert ............... C04B 35/563 |
| | | | 156/89.27 |
| 5,399,069 A | | 3/1995 | Marey et al. |
| 5,765,993 A | | 6/1998 | Weiss |
| 6,045,310 A | | 4/2000 | Miller et al. |
| 6,409,472 B1 | | 6/2002 | McMahon et al. |
| 6,595,747 B2 | | 7/2003 | Bos |
| 6,648,597 B1 | | 11/2003 | Widrig et al. |
| 7,044,709 B2 | | 5/2006 | Bruce et al. |
| 7,329,087 B2 | * | 2/2008 | Cairo ...................... F01D 5/147 |
| | | | 415/135 |
| 7,393,182 B2 | | 7/2008 | Matheny |
| 7,549,840 B2 | | 6/2009 | Subramanian et al. |
| 7,754,126 B2 | | 7/2010 | Subramanian et al. |
| 7,799,405 B1 | | 9/2010 | Vance et al. |
| 7,832,972 B2 | | 11/2010 | Jarmon |
| 7,950,234 B2 | | 5/2011 | Radonvich et al. |
| 7,988,395 B2 | | 8/2011 | Steffier |
| 8,127,798 B2 | | 3/2012 | Yoskowitz |
| 8,251,652 B2 | * | 8/2012 | Campbell ............... F01D 9/041 |
| | | | 415/209.3 |
| 9,062,562 B2 | * | 6/2015 | Coupe ...................... F01D 9/02 |
| 9,163,519 B2 | | 10/2015 | Kleinow et al. |
| 2004/0062639 A1 | | 4/2004 | Glynn et al. |
| 2005/0254942 A1 | * | 11/2005 | Morrison ............... C04B 37/005 |
| | | | 415/200 |
| 2007/0065285 A1 | * | 3/2007 | Cairo ...................... F01D 5/147 |
| | | | 416/193 A |
| 2009/0193657 A1 | * | 8/2009 | Wilson, Jr. ................ F01D 5/20 |
| | | | 29/889.721 |
| 2011/0027098 A1 | | 2/2011 | Noe et al. |
| 2012/0009071 A1 | | 1/2012 | Tanahashi et al. |
| 2012/0057985 A1 | | 3/2012 | Tanahashi et al. |
| 2012/0301306 A1 | | 11/2012 | Alvanos et al. |
| 2012/0301314 A1 | | 11/2012 | Alvanos et al. |
| 2013/0028741 A1 | | 1/2013 | Kleinow et al. |
| 2013/0101429 A1 | * | 4/2013 | Roussille ................ F01D 5/282 |
| | | | 416/230 |
| 2014/0205463 A1 | * | 7/2014 | Herraiz .................. F01D 5/282 |
| | | | 416/230 |

FOREIGN PATENT DOCUMENTS

| | | | | |
|---|---|---|---|---|
| EP | | 2412929 A1 | 2/2012 | |
| WO | WO-2012156626 A1 | * | 11/2012 | ............ F01D 5/282 |

OTHER PUBLICATIONS

European Official Action dated Jun. 7, 2018 issued in connection with European Patent Appin. No. 13822051.2; 7 pages.

\* cited by examiner

GAS TURBINE ENGINE COMPOSITE VANE ASSEMBLY AND METHOD FOR MAKING THE SAME

CROSS REFERENCE TO RELATED APPLICATIONS

This application is a continuation of U.S. patent application Ser. No. 14/138,725, which claims priority to and the benefit of U.S. Provisional Patent Application No. 61/774,987, filed 8 Mar. 2013, the disclosures of each of which are expressly incorporated herein by reference.

STATEMENT REGARDING FEDERALLY SPONSORED RESEARCH OR DEVELOPMENT

Embodiments of the present disclosure were made with Unites States government support under Contract No. FA8650-07-C-2803. The government may have certain rights.

TECHNICAL FIELD

The present application relates to gas turbine engine ceramic matrix composite vane assemblies and methods for forming same, and more particularly to multiple-component gas turbine engine CMC assemblies and methods for forming same.

BACKGROUND

Gas turbine engine ceramic matrix composite vane assemblies remain an area of interest. Some existing systems have various shortcomings, drawbacks, and disadvantages relative to certain applications. Accordingly, there remains a need for further contributions in this area of technology.

SUMMARY

One embodiment of the present disclosure is a unique method for forming a gas turbine engine ceramic matrix composite vane assembly in which, among other things, a locking component and/or mat filler material may be provided in a joint portion of the assembly. Other embodiments include unique methods, systems, devices, and apparatus for forming a CMC assembly. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 1:
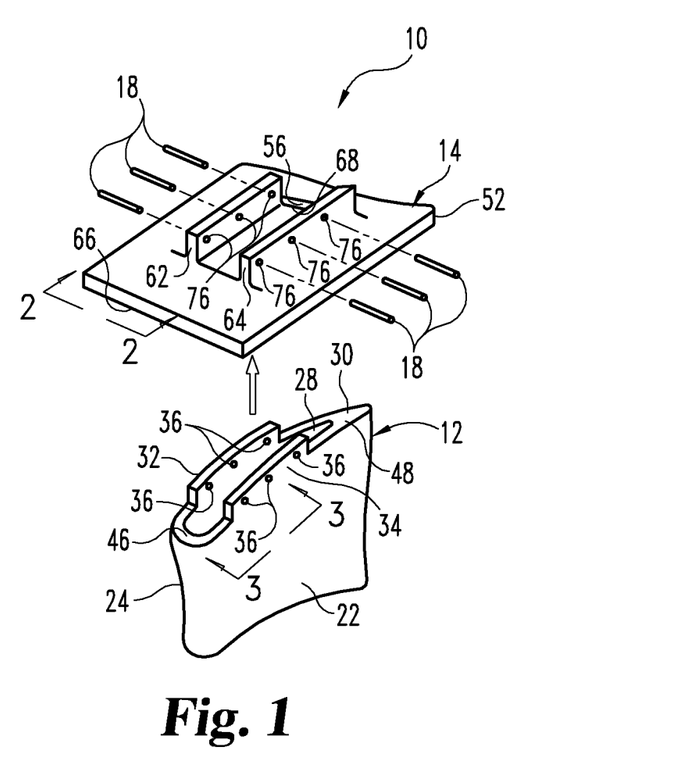
FIG. 1 is an exploded perspective view of a ceramic matrix composite (CMC) assembly according to an embodiment.

FIG. 1 shows an exploded perspective view of a ceramic matrix composite (CMC) assembly 10 according to an embodiment. In the FIG. 1 embodiment, the CMC assembly 10 comprises components suitable for use in a gas turbine engine, although the CMC assembly 10 is not limited to such and other embodiments are contemplated herein. For example, the CMC assembly 10 can comprise vanes and endwalls, cases with shields, or static flow components. In one form, the CMC assembly 10 can comprise ceramic matrix components for use in the hot section of a nuclear reactor.

Referring to FIG. 1, the CMC assembly 10 includes an upstanding airfoil 12, an endwall 14, locking components 18, and a mat filler material 20. As will be described in greater detail below, the locking components 18 can lock together the airfoil 12 and endwall 14, and the mat filler material 20 can serve as a bond initiator and/or joint filler to accommodate for example misalignment and/or tolerance errors at the mating faces of the airfoil 12 and the endwall 14 or at the mating faces of the locking component 18 and the airfoil 12 and/or the endwall 14.

The airfoil 12 and endwall 14 can be preform partially-rigidized or un-rigidized components. The components can be fabricated of woven or non-woven fiber. The fibers can be arranged and fixed by any suitable technique for example as by lay-up of fabrics, filament winding, braiding, knotting, or any combination of these. Further, the components can be partially or fully densified, or partially or fully infiltrated so as to fill in one or more gaps between fibers of matrix material. The components can also be of near-net shape and/or machined and/or undergo further treatments such as coating or impregnation of the matrix material, in order to, for example, provide features that constrain the CMC assembly 10 when used in conjunction with one or more locking components 18. It will be appreciated that the CMC assembly 10 can be constructed of preform components having different configurations as necessary or desired for a particular application. In the FIG. 1 embodiment, for example, the airfoil 12 and endwall 14 each comprise a preform, and are trimmed and machined.

The airfoil 12 has a pressure side 22 and a suction side 24 that define a hollow 28 therebetween. A pair of airfoil connecting tabs 32, 34 can be formed and/or machined at one end 30 of the airfoil 12 to extend in the spanwise direction of the airfoil 12. The airfoil connecting tabs 32, 34 each have through holes 36 that are sized to receive the locking components 18, as will be described in greater detail below. One airfoil connecting tab 32 projects outwardly from and has substantially the same contour as the pressure side 22 of the airfoil 12. The other airfoil connecting tab 34 projects outwardly from and has substantially the same contour as the suction side 24 of the airfoil 12. At opposite ends of the connecting tabs 32, 34 in the chordwise direction of the airfoil 12, the end 30 of the airfoil 12 can be configured to form a pair of seat portions 46, 48 that interface with the endwall 14 and/or the mat filler material 20.

Figure 3:
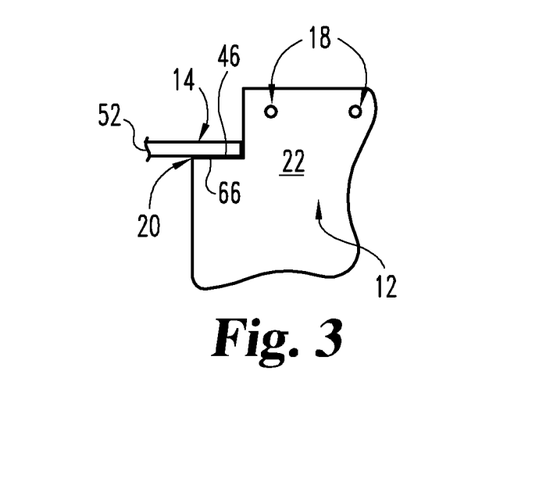
FIG. 3 is a side elevational view of the CMC assembly of FIG. 1 taken at elevation 3-3 of FIG. 1.

The endwall 14 includes a platform portion 52 having an opening 56 that is sized to receive therethrough the airfoil connecting tabs 32, 34. On opposite sides of the opening 56, a pair of endwall connecting tabs 62, 64 can be formed and/or machined in the endwall 14 to correspond to the suction side 24 and pressure side 22 of the airfoil 12 in a state where the endwall 14 is assembled to the airfoil 12 in the FIG. 1 embodiment. As illustrated in FIG. 1, the endwall connecting tabs 62, 64 can correspond substantially in size and shape to the airfoil connecting tabs 32, 34 of the airfoil 12. The endwall connecting tabs 62, 64 can project in a manner that is upstanding relative to the platform portion 52 of the endwall 14 and substantially parallel relative to the airfoil connecting tabs 32, 34 of the airfoil 12. Referring to FIGS. 1 and 3, at opposite ends of the opening 56 corresponding to opposite ends of the airfoil connecting tabs 32, 34 in the spanwise direction of the airfoil 12, the platform portion 52 of the endwall 14 has cooperating surfaces 66, 68 (underside of the endwall 14 as shown in FIGS. 1 and 3) that rest upon or over the seat portions 46, 48, respectively, at the end 30 of the airfoil 12. The cooperative relationship between the cooperating surfaces 66, 68 and the seat portions 46, 48 resists or prevents the endwall 14 from translating down the airfoil 12, as would be the inclination in the instance where for example greater pressure is applied to the top side (as shown in FIG. 1) of the endwall 14 than the underside thereof. Like the airfoil connecting tabs 32, 34, the endwall connecting tabs 62, 64 each have through holes 76 that are sized to receive the locking components 18.

Figure 2:
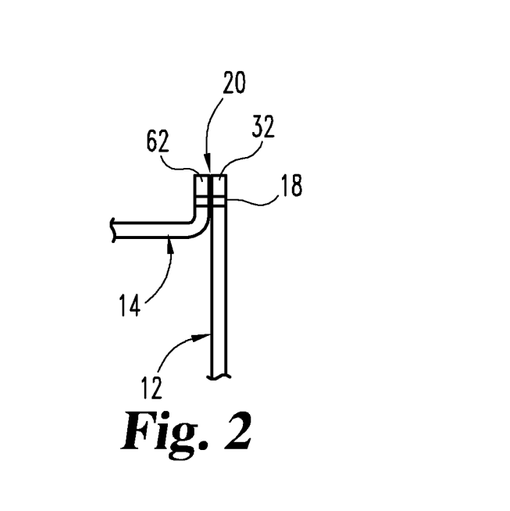
FIG. 2 is an end elevational view of the CMC assembly of FIG. 1 taken at elevation 2-2 of FIG. 1.

As illustrated in FIG. 2, in an assembled state the locking components 18 pass through the through holes 36, 76 in the airfoil 12 and endwall 14. When fitted in the through holes 36, 76, the locking components 18 lock the airfoil 12 into place relative to the endwall 14, preventing withdrawal of the airfoil 12 from the endwall 14 in the direction from which the airfoil 12 was inserted into the endwall 14, i.e. in the spanwise direction of the airfoil 12. The locking components 18 can take the form of locking pins, although the locking components 18 are not limited as such, and other embodiments are contemplated. For example, the locking components 18 can be sized to fit into a feature such as a through-hole or cavity in and/or between one or more of the preform airfoil and endwall components. With respect to the FIG. 1 embodiment, as shown in FIG. 2, the locking components 18 can be substantially the same length as the combined thickness of the endwall connecting tab 62, the airfoil connecting tab 32, and the mat filler material 20 therebetween. The locking components 18 can be fabricated of braided woven or non-woven fiber. Further, the locking components 18 can be partially or fully densified. The locking components 18 can also be of near-net shape and/or machined in order to, for example, provide features that facilitate constraining the preform components of the CMC assembly 10. In the FIG. 1 embodiment, for example, the locking components 18 each comprise a preform, and are trimmed and machined.

Referring now to FIGS. 2 and 3, a mat filler material 20 can be provided between the mating faces of the airfoil 12 and the endwall 14. For example, as shown in FIG. 2, the mat filler material 20 can be provided between the endwall connecting tab 62 of the endwall 14 and the airfoil connecting tab 32 of the airfoil 12. As shown in FIG. 3, the mat filler material 20 can be provided between the cooperating surface 66 of the endwall 14 and the seat portion 46 of the airfoil 12. The mat filler material 20 can serve for example as a joint filler material and/or bond initiator during for example chemical vapor infiltration (CVI) processing. The mat filler material 20 can comprise for example pre-cut pieces that substantially match for example the dimensions of the mating faces of the airfoil 12 and the endwall 14. The mat filler material 20 can be utilized for example to close unsuitable gaps between machined or near-net partially-rigidized components. The mat filler material 20 can be of non-woven material. In one example, the mat filler material 20 can be in its raw, unprocessed state. As will be appreciated, the mat filler material 20 can be of any thickness, or a varying thickness, that is necessary or desired for a particular application.

Figure 4:
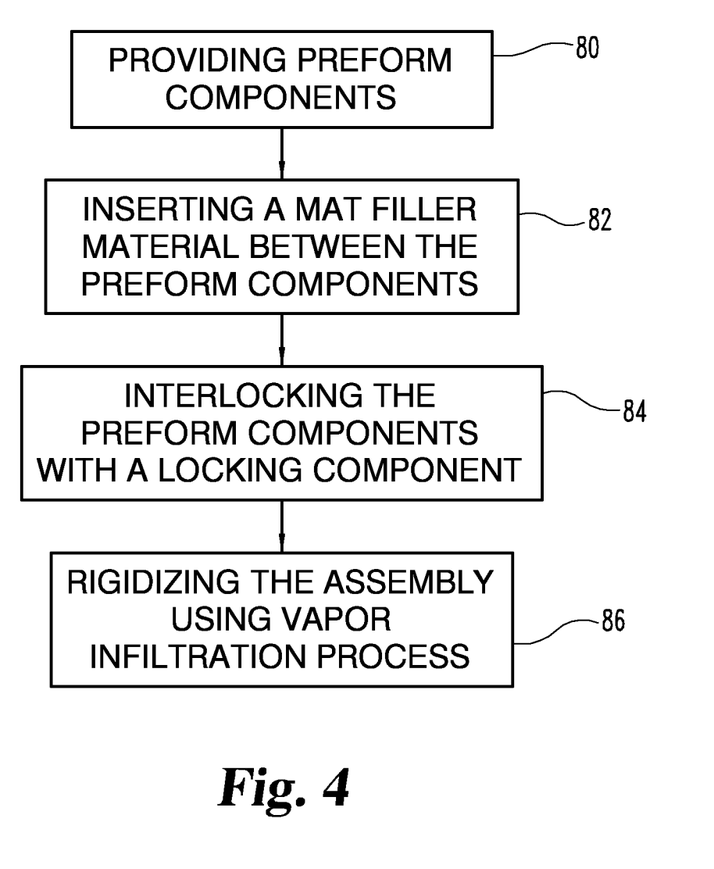
FIG. 4 is a flowchart depicting steps according to an embodiment of a process for forming a CMC assembly.

FIG. 4 is a flowchart depicting steps of a process for forming a CMC assembly according to an embodiment. The airfoil 12 and endwall 14 preform components can be provided in their un-rigidized or partially-rigidized states (Step 80). The formed or machined airfoil connecting tabs 32, 34 can be pushed through the opening 56 in the endwall 14 so that the airfoil connecting tabs 32, 34 are alongside the endwall connecting tabs 62, 64, as shown for example in FIG. 2, and the cooperating surfaces 66, 68 of the endwall 14 rest over or upon the seat portions 46, 48 of the airfoil 12, as shown for example in FIG. 3. The mat filler material 20 can be placed between the mating faces of the airfoil 12 and endwall 14, for example between the cooperating surface 66 and the seat portion 46, either before or after the airfoil connecting tabs 32, 34 are pushed through the opening 56 (Step 82). The locking components 18 can be inserted into the through holes 36 and 76 in the respective airfoil connecting tab 32 and endwall connecting tab 62, as shown for example in FIG. 2, and into the through holes 36 and 76 in the respective airfoil connecting tab 34 and endwall connecting tab 64, to lock the airfoil 12 to the endwall 14 (Step 84). The mat filler material 20 can be placed between the mating faces of the airfoil 12 and the endwall 14, for example between the airfoil connecting tab 32 and the endwall connecting tab 62 as shown in FIG. 2, either before or after the airfoil connecting tabs 32, 34 are pushed through the opening 56, or before or after the locking components 18 are inserted into the through holes 36 and 76. The assembled airfoil 12, endwall 14, locking components 18, and mat filler material 20 can be rigidized using a vapor infiltration process (Step 86). As will be appreciated, any suitable process can be used for rigidizing the components, including for example chemical vapor infiltration, slurry/melt infiltration, polymer infiltration process, combined infiltration processes, to name just a few.

Figure 5:
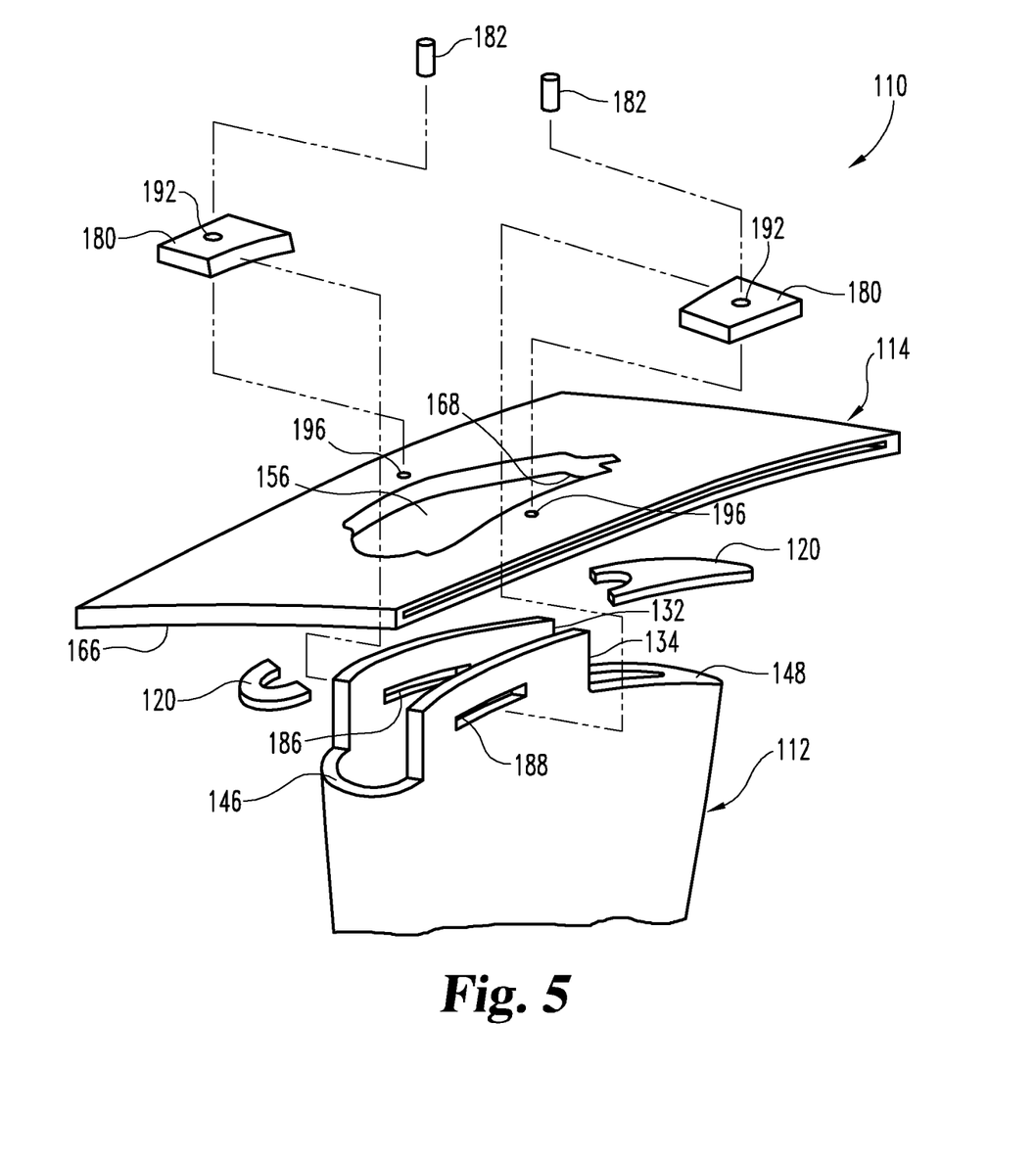
FIG. 5 is an exploded perspective view of a ceramic matrix composite (CMC) assembly according to another embodiment.
Figure 6:
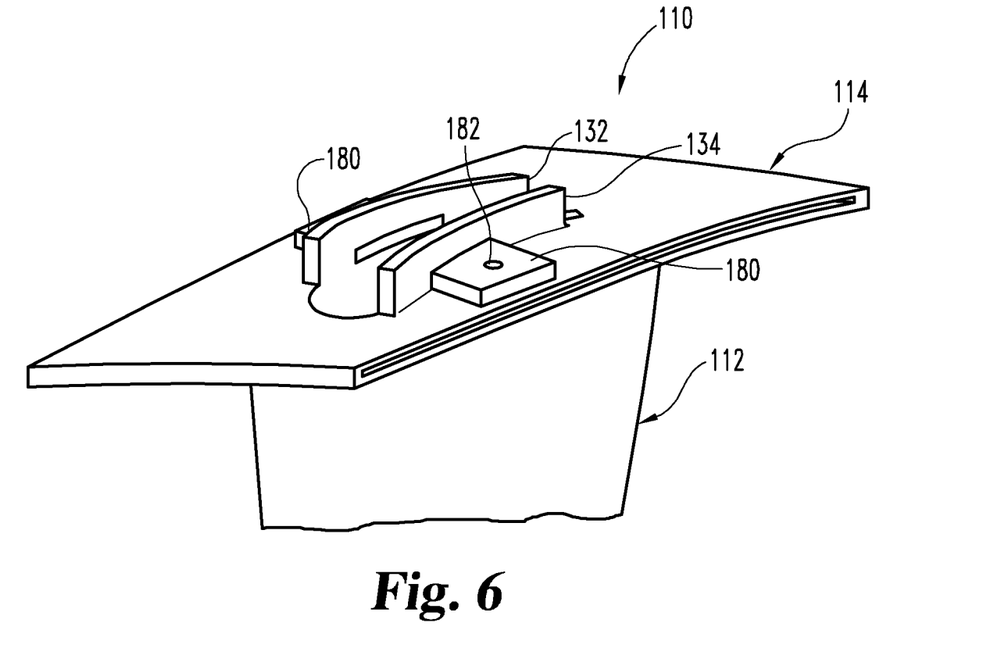
FIG. 6 is a perspective view of the CMC assembly of FIG. 4.

FIGS. 5 and 6 show a CMC assembly 110 according to an another embodiment. Like the FIG. 1 CMC assembly 10, the CMC assembly 110 includes an airfoil 112 having airfoil connecting tabs 132, 134 that fit through an opening 156 of the endwall 114, and the endwall 114 rests over or upon seat portions 146, 148 of the airfoil 112. Further, like the FIG. 1 embodiment, the FIG. 5 embodiment can have a mat filler material 120 provided between mating faces of the airfoil 112 and endwall 114, for example, between the cooperating surfaces 166 and 168 of the endwall 114 (underside of the endwall 114 as shown in FIGS. 4 and 5) and the seat portions 146 and 148 of the airfoil 112.

The CMC assembly 110 has locking components 180, 182 that lock the airfoil 112 and endwall 114 together in a manner different from that of the locking components 18 of the FIG. 1 embodiment. The locking components 180 can take the form of substantially rectangular shape locking members. As shown in FIG. 5, the rectangular shape locking members 180 can be sized to fit into corresponding pre-machined or pre-formed substantially rectangular shape slots 186, 188 in the respective airfoil connecting tabs 132, 134. The slots 186, 188 can be positioned immediately above the endwall 114 in a state where the endwall 114 is assembled to the airfoil 112 in the FIG. 5 embodiment. When the rectangular shape locking members 180 are fitted in the slots 186, 188, the rear portions of the rectangular shape locking members 180 rest over or upon the endwall 114 to lock the airfoil 112 into place relative to the endwall 114. As shown in FIG. 6, the endwall 114 can be interlocked between the rectangular shaped locking members 180 and the seat portions 146 and 148 of the airfoil 112, which prevents withdrawal of the airfoil 112 from the endwall 114 in the direction from which airfoil 112 was inserted into the endwall 114, i.e. in the spanwise direction of the airfoil 112.

The locking components 182 can take the form of locking pin members. Referring again to FIG. 5, the locking pin members 182 can be sized to fit into corresponding through holes 192 in the rectangular shape locking members 180 and through holes 196 in the endwall 114. The locking pin members 182 can be substantially the same length as the combined thickness of the endwall 114 and the rectangular shape locking member 180. The locking pin members 182 can serve to maintain structural integrity of the CMC assembly 110 by for example preventing withdrawal of the rectangular shape locking members 180 from the slots 186, 188 during subsequent processing or at any time during the life of the components should for example the bond between an airfoil connecting tab 132, 134 and its corresponding rectangular shape locking member 180 fail.

Figure 7:
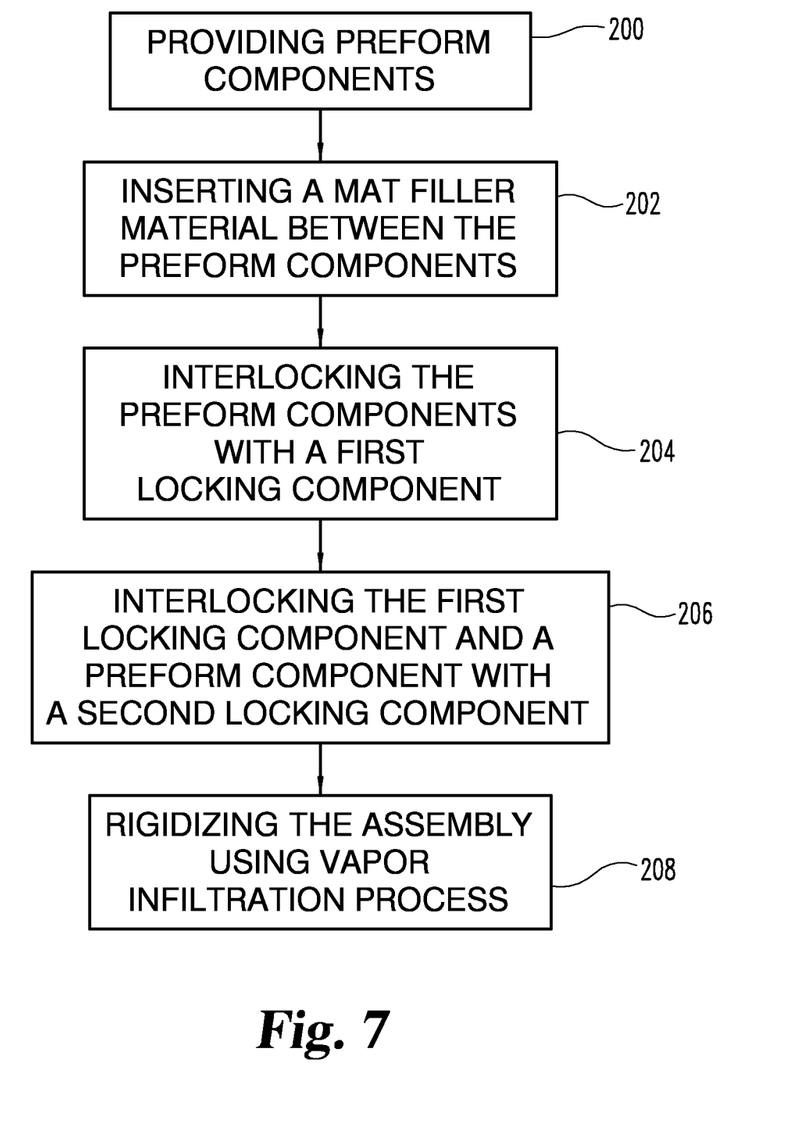
FIG. 7 is a flowchart depicting steps according to an embodiment of a process for forming a CMC assembly.

FIG. 7 is a flowchart depicting steps of a process for making a CMC assembly according to an embodiment. The airfoil 112 and endwall 114 preform components can be provided in their un-rigidized or partially-rigidized states (Step 200). Next, the formed or machined airfoil connecting tabs 132, 134 can be pushed through the opening 156 in the endwall 114 so that the airfoil connecting tabs 132, 134 project through the opening 156 and the cooperating surfaces 166, 168 of the endwall 114 rest over or upon the seat portions 146, 148 of the airfoil 112, as shown for example in FIG. 6. The mat filler material 120 can be placed between the mating faces of the airfoil 112 and endwall 114, for example between the cooperating surface 166 and the seat portion 146, either before or after the airfoil connecting tabs 132, 134 are pushed through the opening 156 (Step 202). The first locking components, that is the rectangular shape locking members 180, can be inserted into the slots 186, 188 in the respective airfoil connecting tabs 132, 134, as shown for example in FIG. 6, to lock the airfoil 112 to the endwall 114 (Step 204). In the illustrated embodiment, the inward facing surfaces of the rectangular shape locking members 180 are substantially aligned with, that is flush with, the corresponding inward facing surfaces of the airfoil connecting tabs 132, 134. The second locking components, that is, the locking pin members 182, can be inserted into the corresponding through holes 192 in the rectangular shape locking members 180 and the through holes 196 in the endwall 114, as shown in FIG. 6 (Step 206). The assembled airfoil 112, endwall 114, locking components 180, 182, and mat filler material 120 can be rigidized using a vapor infiltration process (Step 208). As will be appreciated, any suitable process can be used for rigidizing the components, including for example chemical vapor infiltration, slurry/melt infiltration, polymer infiltration process, combined infiltration processes, to name just a few.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A method for forming a gas turbine engine component comprising:
    providing at least two composite preform components, the composite preform components comprising an airfoil and an endwall shaped to define an opening sized to receive a portion of the airfoil,
    interlocking the composite preform components with a first locking component so that mating faces of the composite preform components face each other, and
    inserting a filler material between the mating faces of the composite preform components,
    wherein the airfoil includes an airfoil body, a seat portion defined by a portion of an outer end of the airfoil body, and at least one airfoil connecting tab that extends from the outer end perpendicular to the seat portion, the airfoil body including a pressure side wall and a suction side wall that define a hollow space therebetween, and the opening of the endwall is sized to receive therethrough the at least one airfoil connecting tab,
    wherein the providing step comprises inserting the at least one airfoil connecting tab of the airfoil into the opening of the endwall so that the endwall rests over the seat portion, and
    wherein the seat portion provides the mating face of the airfoil and the portion of the endwall over the seat portion provides the mating face of the endwall, and the inserting the filler material comprises inserting the filler material between the mating face of the airfoil and the mating face of the endwall.

2. The method of claim 1, wherein one or more of the composite preform components are provided in a partially rigidized state.

3. The method of claim 1, wherein the composite preform components comprise woven fiber.

4. The method of claim 1, wherein the interlocking comprises inserting the first locking component into a through hole in the at least one airfoil connecting tab so that a rear portion of the first locking component rests over a portion of the endwall to interlock the endwall between the first locking component and the seat portion.

5. The method of claim 1, wherein the endwall includes a platform portion and at least one endwall connecting tab that extends from the platform portion perpendicular to the platform portion, and the interlocking comprises inserting the first locking component into a through hole in the at least one airfoil connecting tab and a through hole in the at least one endwall connecting tab.

6. The method of claim 1, further comprising rigidizing the assembly of the composite preform components, the first locking component, and the filler material.

7. The method of claim 6, wherein the rigidizing comprises using vapor infiltration.

8. The method of claim 5, wherein airfoil includes a first airfoil connecting tab that extends from the pressure side wall of the airfoil body and a second airfoil connecting tab that extends from the suction side wall of the airfoil body, wherein the endwall includes a first endwall connecting tab that extends from the platform portion perpendicular to the platform portion and a second endwall connecting tab spaced apart from the first endwall connecting tab that extends from the platform portion perpendicular to the platform portion, and wherein the first airfoil connecting tab is in side-by-side relation to the first endwall connecting tab and the second airfoil connecting tab is in side-by-side relation to the second endwall connecting tab.

9. The method of claim 5, wherein the providing comprises inserting the at least one connecting tab of the airfoil into the opening of the endwall so that the at least one airfoil connecting tab is in side-by-side relation with the at least one endwall connecting tab.

10. The method of claim 9, wherein the at least one airfoil connecting tab of the airfoil provides a first tab mating face, the at least one endwall connecting tab of the endwall provides a second tab mating face that faces the first tab mating face when the composite preform components are interlocked with the first locking component, and the inserting the filler material comprises inserting the another filler material between the first tab mating face of the airfoil and the second tab mating face of the endwall.

11. A method for forming a gas turbine engine component comprising:
providing at least two composite preform components, the composite preform components comprising a first component and a second component, wherein the first component includes a body, at least one seat portion defined by a portion of an outer end of the body, and at least one connecting tab that extends from the outer end perpendicular to the at least one seat portion, and the second component is shaped to define an opening,
inserting the at least one connecting tab of the first component into the opening of the second component so that the second component rests over the at least one seat portion,
interlocking the composite preform components with a first locking component so that a first mating face of the first component and a second mating face of the second component face each other, and
inserting a first filler material between the first mating face of the first component and the second mating face of the second component,
wherein the at least one seat portion provides the first mating face of the first component and the portion of the second component over the at least one seat portion provides the second mating face of the second component.

12. The method of claim 11, wherein one or more of the composite preform components are provided in a partially rigidized state.

13. The method of claim 11, wherein the composite preform components comprise woven fiber.

14. The method of claim 11, wherein the interlocking comprises inserting the first locking component into a through hole in the at least one connecting tab of the first component so that a rear portion of the first locking component rests over a portion of the second component to interlock the second component between the first locking component and the seat portion.

15. The method of claim 11, wherein the airfoil includes a pair of seat portions having a first seat portion located at a leading edge of the airfoil and a second seat portion located at the trailing edge of the airfoil, wherein the first seat portion provides the first mating face of the first component and the portion of the second component over the at least one seat portion provides the second mating face of the second component.

16. The method of claim 11, further comprising inserting a second filler material between a third mating face of the first component and a fourth mating face of the second component that face each other when the composite preform components are interlocked with the first locking component, wherein the second seat portion of the first component provides the third mating face of the first component and another portion of the second component over the second seat portion provides the fourth mating face of the second component.

17. The method of claim 11, wherein the second component includes a platform portion and at least one connecting tab that extends from the platform portion perpendicular to the platform portion, the at least one connecting tab of the first component is in side-by-side relation with the at least one connecting tab of the second component when inserting the at least one connecting tab of the first component into the opening of the second component, and the interlocking comprises inserting the first locking component into a through hole in the at least one connecting tab of the first component and a through hole in the at least one connecting tab of the second component.

18. The method of claim 17, further comprising inserting a second filler material between a third mating face of the first component and a fourth mating face of the second component that face each other when the composite preform components are interlocked with the first locking component, wherein the at least one connecting tab of the first component provides the third mating face of the first component and the at least one connecting tab of the second component provides the fourth mating face of the second component.

19. The method of claim 11, further comprising rigidizing the assembly of the composite preform components, the first locking component, and the filler material.

20. The method of claim 19, wherein the rigidizing comprises using vapor infiltration.

* * * * *